Feb. 23, 1960   L. G. URQUHART ET AL   2,925,739
HARNESS SHEAVES
Filed Jan. 15, 1957

Lloyd G. Urquhart,
Bernard Thal,
   Inventors
by Robert K. Randall.
   Attorney

2,925,739
HARNESS SHEAVES

Lloyd G. Urquhart, Westboro, and Bernard Thal, Brighton, Mass., assignors to H. F. Livermore Corporation, Allston, Mass., a corporation of Delaware Application January 15, 1957, Serial No. 634,200

2 Claims. (Cl. 74—230.01)

This invention relates to sheaves or pulleys, and in particular to the sheaves which are used in cloth looms for guiding the cords by means of which the pattern mechanism or head motion, so-called, controls the position of the harnesses that lift and lower the warp yarns.

In the pattern mechanism or head motion, the levers which actuate the harnesses are made thin and placed close together for necessary compactness and economy of space. Each lever is allowed $15/32''$ lateral space for its thickness in one customary form, and $3/8''$ in a head motion of another common gage. As the harnesses are hung in banks with exactly the same $3/8''$ or $15/32''$ allowance of space, each sheave in the bank of sheaves mounted side by side on a common axle to guide the harness cords in their change of direction from vertical to horizontal course is restricted to the same lateral space as regards its thickness. In fact, the available space is so limited that it has been common in prior harness sheaves to sacrifice one side wall of what would otherwise be the groove formed in the rim to receive the harness cord, just in order to make the remaining wall thick and strong enough to stand up in use, and still be able to get the sheaves into the space available as determined by the gage of the head motion and the harnesses. This resort results in the chafing of the harness cord against the wall of the stationary or relatively moving adjacent sheave unless under-sized cords are used. This latter change of course has the fault of shortening the useful life of the harness cords. Also, there is the problem of lubrication of the sheaves on their axle. The sheave bearings are practically inaccessible because the sheaves are so closely banked, while if used at all the oil or grease causes the accumulation of lint and fly in the bearings to impede or check their rotation, and also escapes to rot the harness cords and fall onto the yarns to create stains in the fabric. If omitted, as is common, the bearings wear out of round, the sheaves tilt and work unevenly, and the weaving of the fabric is impaired. These are well known faults of the common wooden harness sheave widely used hitherto.

In the effort to avoid these drawbacks, harness sheaves have been fashioned out of Bakelite, making the groove semi-circular, necessarily on a radius considerably greater than that of the cord, to avoid chafing the cord, with the result of making the walls so thin that the relatively brittle Bakelite speedily became chipped, and the ragged walls chafed and wore out the harness cords. The cord easily escaped from the groove, especially when chipped, to run on an adjacent sheave or cord with excessive wear.

What is required is a material that, unlike Bakelite, will not chip, flake, or powder off, yet will be stable and free from warping, splitting, or distortion in use, will need no lubrication, and will be strong enough to support the loads and strains incident to its function when its transverse dimensions and sections are reduced below those compelled by the nature of prior materials and construction.

The desired material has been found in the form of nylon commercially available from E. I. du Pont de Nemours Co., Wilmington, Delaware, under the name of "Zytel No. 101" (old Nylon No. 10001). From this material a harness sheave of longer life and better performance has been produced, when made in the form and dimensions set forth hereinafter.

This superior form of harness sheave takes advantage of the easy molding character of this material to add strength and stiffness and greater wear resistance to the sheave, thereby increasing its useful life under heavy duty with a minimum of material and hence low cost.

Preferably, the novel sheave is further improved by immersing it in a bath of heated lubricating oil to impregnate the nylon therewith and incidentally to anneal it. The oil thus caused to permeate the nylon provides a built-in supply of lubricant adding to the useful life of the sheave and obviates resort to the ineffectual attempt to apply lubricant to the bearing surfaces after installation of the sheaves.

The manner of attaining these and other advantages is set forth hereinafter.

An illustrative embodiment of the invention is shown in the accompanying drawings, in which Fig. 1 is a side view of the improved sheave.

Figure 1:
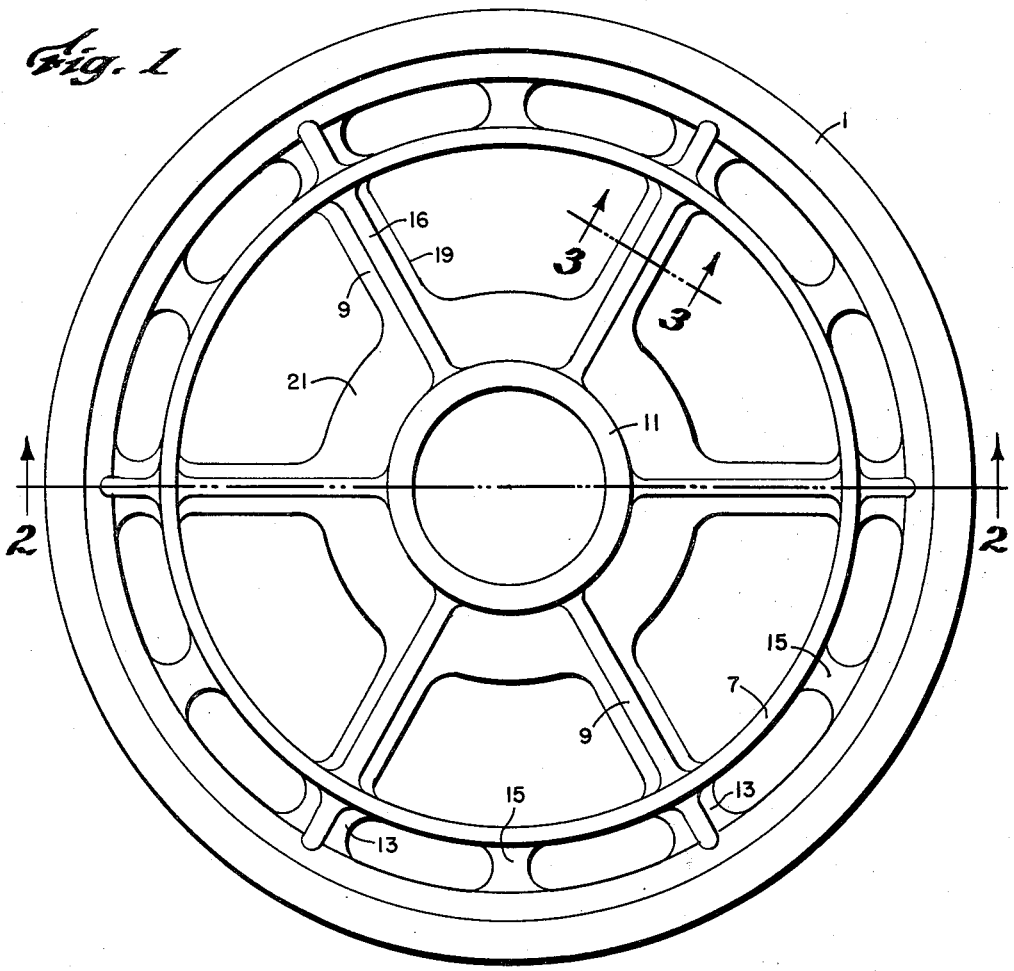
Figure 2:
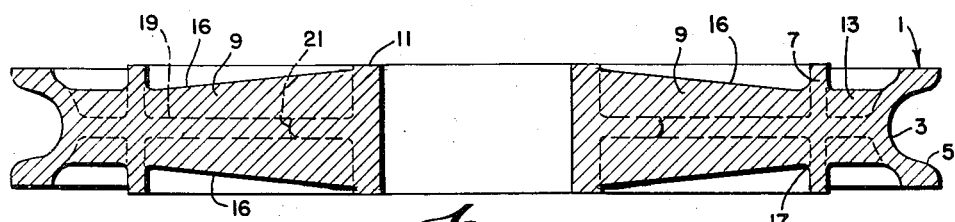
Fig. 2 is a section on line 2—2 of Fig. 1.
Figure 3:
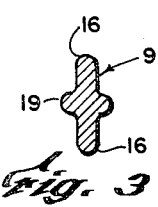
Fig. 3 is a section on line 3—3 of Fig. 1.

The novel sheave is adapted to be formed of nylon of the type indicated above, in finished form in a single operation by injection molding. The rim 1 is made with a groove having its bottom 3 formed on a radius, and slightly less than a semi-circle in extent, and the internal walls 5 of the groove tangent thereto have a slight flare and rounded lips. The walls 5 define between them an angle of from 10° to 40°, the latter figure being used in sheaves for head motions of $15/32''$ gage, and the other figure for $3/8''$ gage head motions.

The cross-sectional area of the rim is enabled to be made light and at the same time strong and the whole sheave made rigid as well as capable of bearing heavy loads and long lasting in use, by the provision of a circular flange or inner rim 7 concentric with the rim 1 and spaced inwardly therefrom. This flange 7 is integral with the spokes 9 radiating from hub 11, the spokes continuing beyond the flange to the rim as indicated at 13. At the mid-point between each two spokes the rim 1 is further connected to the flange 7 by integral struts 15. Thereby a load or stress directed radially inward on the rim in the interval between successive spokes is transmitted to the segment of flange 7 bridging the interval between such spokes. This segment serves as an arcuate brace resisting the inward thrust imposed upon the rim at points in this interval where the rim would otherwise be unsupported. This construction requires materially less of the relatively high-priced nylon than would the insertion of complete spokes at these mid-points, while attaining a favorably comparable increase in strength.

The flange 7 further serves as a rub-ring to take the wear caused by contact with the adjacent identical sheaves in the bank, and strung on a common shaft with no room for means to separate them. This flange 7 is given the same width (measured in the direction parallel to the axis) as the length (axial extent) of the hub 11, while the corresponding overall width of the rim 1 is reduced .010 inch below this dimension. So when the sheaves rub together, as they inevitably do because the narrow bearing surface at their hubs cannot hold them in true radial planes and keep them from tilting even when the hubs extend farther axially than the rims, the wear falls on the edges of the flanges 7. Thus the walls of the rims are kept from rubbing together and wearing thin and sharp, with eventual weakening and failure, for a prolonged period and until the flanges have been worn down.

As a specific example of the proportions in a preferred construction of 15/32" gage harness sheave, the width of the rim 1, measured axially, will be .454" with a tolerance of ±.004", while the flange 7 and hub 11 will both be made .464" within a tolerance of ±.004" in axial extent. The hub's internal diameter is made to fit easily and rotatably upon a 3/4" shaft.

To impart lateral stability, the spokes 9 are of flattened cross-section having their major transverse dimension disposed in planes parallel to and passing through the axis of the hub. The lateral ribs 16 are of liberal width, each spoke measuring 11/16" in axial extent just inside the fillets 17 where the spoke joins the flange 7, and widening to the full axial extent of the hub 11 at the spoke's junction therewith. They also have fins 19 extending circumferentially, to stiffen them and to increase their support of the flange 7. The continuations 13 of the spokes to the rim 1 are of corresponding shape and dimensions in cross-section. The struts 15 omit the laterally extending ribs. A wide web 21 extends radially from hub 11 at mid-length thereof and joins the fins 19 of spokes 9 to support and strengthen the latter. Fillets are used in all angles throughout.

Because the preferred material, nylon, is characterized by a particularly low coefficient of friction, the flanges wear down very slowly, and likewise the rims when they finally do come together.

Further, to extend the useful life of the novel sheave, it is preferably impregnated with oil by immersing it in a bath of mineral lubricating oil of S.A.E. #10 or other suitable or desired characteristics at a temperature of from 150° to 212° F. for from 15 to 20 minutes at atmospheric pressure. The resulting permeation of the nylon by the oil provides a substantially permanent supply of lubricant for the bearing surfaces in the hub and on the sides of the sheave which is continually maintained or replenished by migration from the supply stored within the nylon. The hot oil treatment also serves to anneal or plasticise the nylon sufficiently to relieve residual strains created during and after the molding of the sheave.

While we have illustrated and described a certain form in which the invention may be embodied, we are aware that many modifications may be made therein by any person skilled in the art, without departing from the scope of the invention as expressed in the claims. Therefore, we do not wish to be limited to the particular form shown, or to the details of construction thereof, but what we do claim is:

1. Harness sheave for a harness cord of a loom comprising an integral structure of molded plastic material having a hub, a grooved rim having a bottom to support the cord, spokes of ribbed section joining the rim to the hub, a flange wider in an axial direction than the grooved rim extending continuously around the sheaves spaced radially inward from the grooved rim and in concentric relation to the rim and hub and intersected by the spokes, and supports joining the rim and flange at intervals between the spokes.

2. Harness sheave for looms comprising an integral structure of molded plastic material having a hub, a U-section rim, spokes of flattened cross-section having their major transverse dimension disposed in planes parallel to the hub's axis, a radial web at mid-length of the hub joining adjacent pairs of spokes, and extending outwardly along the spokes to form ribs thereon, and a concentric flange radially within and wider than the rim.

References Cited in the file of this patent

UNITED STATES PATENTS

| | | |
|---|---|---|
| 326,873 | Jones | Sept. 22, 1885 |
| 425,734 | Birch | Apr. 15, 1890 |
| 1,076,605 | Reston | Oct. 21, 1913 |
| 1,174,357 | Scherer | Mar. 7, 1916 |
| 1,894,432 | Watson | Jan. 17, 1933 |
| 2,101,454 | Rogers | Dec. 7, 1937 |
| 2,379,743 | Payne | July 3, 1945 |
| 2,497,224 | Laure | Feb. 14, 1950 |
| 2,760,378 | Van Deventer | Aug. 28, 1956 |
| 2,809,531 | Moyer | Oct. 15, 1957 |